United States Patent [19]
Tantlinger

[11] 3,977,266
[45] Aug. 31, 1976

[54] MULTIPLE BELT TENSION CONTROL MECHANISM

[75] Inventor: Keith W. Tantlinger, Coronado, Calif.

[73] Assignee: Rohr Industries, Inc., Chula Vista, Calif.

[22] Filed: July 28, 1975

[21] Appl. No.: 599,670

[52] U.S. Cl. .................. 74/242.11 C; 74/242.11 R; 74/242.15 R
[51] Int. Cl.² ........................ F16H 7/12; F16H 7/10
[58] Field of Search ............ 74/242.11 C, 242.11 R, 74/242.15 R

[56] References Cited
UNITED STATES PATENTS
952,156  3/1910  Treinhella ..................... 74/242.11 R FOREIGN PATENTS OR APPLICATIONS
293,227  7/1928  United Kingdom .......... 74/242.11 E Primary Examiner—Leonard H. Gerin
Attorney, Agent, or Firm—Patrick J. Schlesinger

[57] ABSTRACT

For controlling the tension on the belts of a multiple belt drive, one or more sheaves are journaled on each end of a walking beam, which in turn is pivotally mounted on a spring-biased lever. The total number of sheaves employed corresponds to the number of belts in the multiple belt drive, and the sheaves are spaced apart axially thereof, and the lever is so mounted, that one of the sheaves is in rolling, bearing engagement with each of the belts. The walking beam-to-lever pivotal connection is so located as to cause the sheaves to exert equal, or controlled differential, pressure on all of the belts.

7 Claims, 4 Drawing Figures

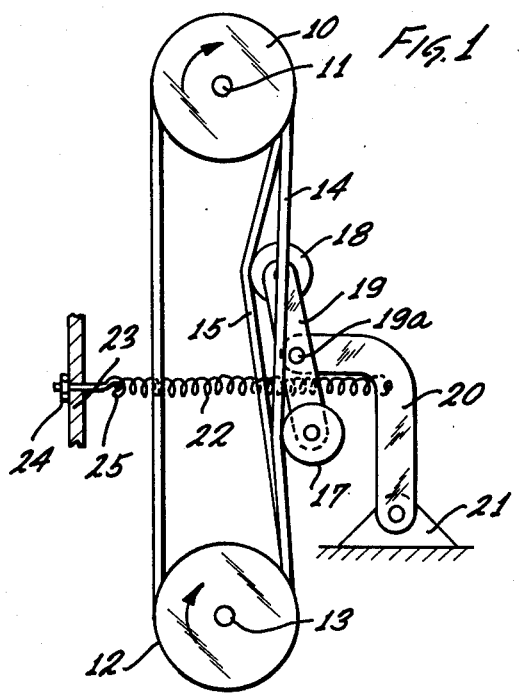
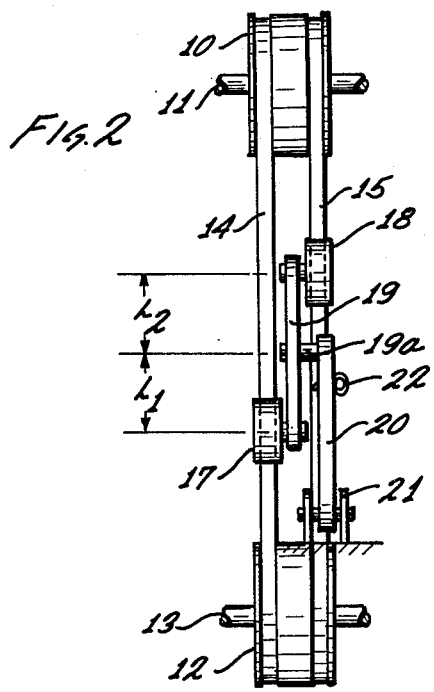
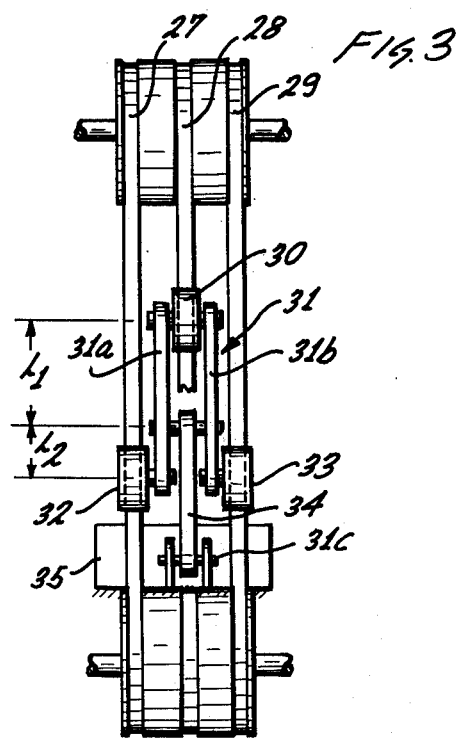
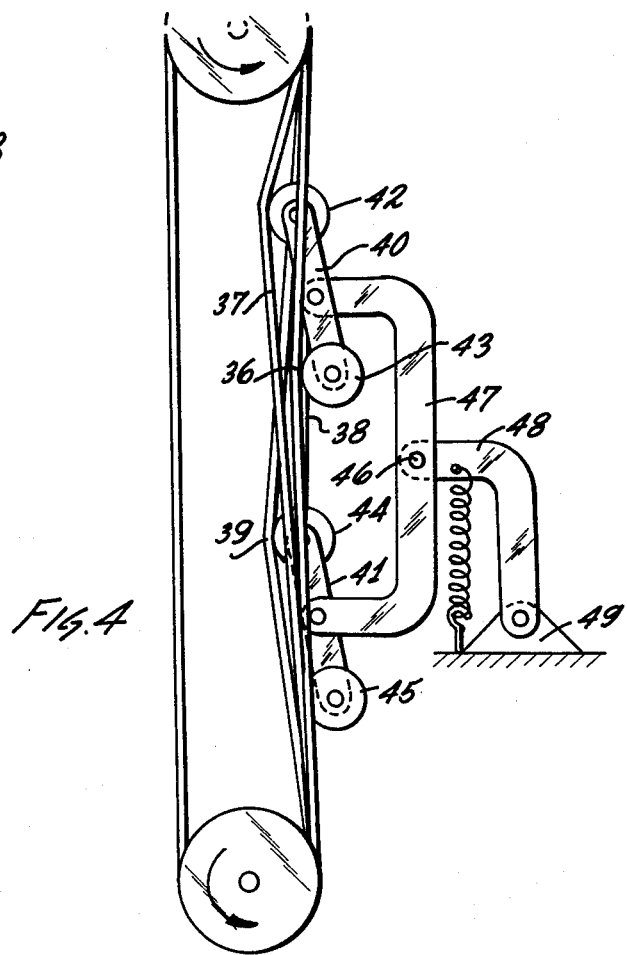

MULTIPLE BELT TENSION CONTROL MECHANISM

BACKGROUND OF THE INVENTION

It is common practice to control belt tension by providing sheaves of various types bearing against drive belts of various kinds with a selected pressure exerted on the sheaves. As disclosed in U.S. Pat. No. 2,213,992, a plurality of pressurized sheaves are provided to equalize the tension on the belts of a multiple belt drive. However, in that patent the pressure exerted by the sheaves is provided either by a plurality of pressurized cylinders, each acting on one of the sheaves, or by a continuous cord passed around a number of sheaves other than the belt pressurizing sheaves, and this pressure then transmitted to the belt pressurizing sheaves. Either of these arrangements is considerably more complicated and expensive than the simple belt tension equalizing mechanism of the present invention.

SUMMARY OF THE INVENTION

The present invention provides belt tension control mechanism for a multiple belt drive, and comprises a plurality of sheaves journaled on opposite ends of a walking beam, with one of the sheaves in rolling, pressure bearing relation with each of the belts. Where more than one sheave is provided on an end of the walking beam, such sheaves are journaled coaxially, and the sheaves on the two ends of the walking beam are divided into two groups as equal as possible with whole numbers. The walking beam is fulcrumed on a lever arm at a point located between the axes of the two groups of sheaves, and, assuming that the purpose is to equalize the tension of all of the belts, the fulcrum is spaced from the axes of the two groups by distances inversely proportional to the number of sheaves in the two groups. The lever arm is pivotally mounted, at a point remote from its fulcrum for the lever arm, to an element adjacent the belts, and selected pressure is applied to the lever arm to urge the sheaves into selected, equalized pressure bearing relation with their respective belts. In the event that a selected, unequal pressure is desired on one or more of the belts, the desired variation in pressure is obtained by variation of the spacing of the respective sheave axes in accordance with the above formula.

BRIEF DESCRIPTION OF THE DRAWINGS

The objectives and advantages of the invention will be apparent from the following description and the accompanying drawings, wherein:

FIG. 1 is a somewhat diagrammatic, side elevational view of one form of the invention for use with a two-belt multiple drive arrangement.

FIG. 2 is an elevational view taken at right angles to FIG. 1.

FIG. 3 is a view similar to FIG. 2, but modified for use with a three-belt multiple drive arrangement.

FIG. 4 is a view generally similar to FIG. 1, but showing a first walking beam with two others pivotally mounted one on each end thereof.

DETAILED DESCRIPTION OF THE DRAWINGS

Referring to the drawings in detail, and considering first the form of the invention shown in FIGS. 1 and 2, a power driven drive pulley 10 is mounted on a drive shaft 11, and is power driven in the direction indicated by the arrow in FIG. 1. A driven pulley 12 is mounted on a driven shaft 13 journaled parallel to the drive shaft 11, each of the pulleys 10 and 12 being of double V-groove type.

A pair of V-belts 14 and 15 are passed around the pulleys 10 and 12, the belts 14 and 15 being of the same designated length, but not necessarily a matched pair as would be the case where no equalizing mechanism is provided. A pair of similar flat face sheaves 17 and 18 are journaled, one on each end of a walking beam 19, in axially parallel relation to each other and to the shafts 11 and 13. The sheaves 17 and 18 are offset axially from each other by the center-to-center distance between the two belts 10 and 12.

The walking beam 19 is mounted medially of its length on the free end of an L-shape level arm 20 for pivotal movement about an axis 19a, which axis is parallel to those of the sheaves 17 and 18. The other end of the lever 20 is pivotally mounted on a suitable element 21, which may be, for example, a frame member adjacent the belts. The lever arm 20 is so mounted that the sheaves 17 and 18 are in rolling, pressure bearing relation with the belts 14 and 15, respectively.

The walking beam 19 thus is seen to be a lever, with its fulcrum located at the axis 19a of its connection to the lever arm 20, and its two points of application comprising the axes of the sheaves 17 and 18, respectively. Since the force exerted by a lever varies directly with the effective length of the lever arm to which the force is applied, and since the two lever arms between the fulcrum axis 19a and the axes of the two sheaves 17 and 18, respectively, are equal, the pressure applied by the sheaves 17 and 18 on their respective belts will also be equal.

For biasing the sheaves 17 and 18 into pressure bearing relation with the belts 14 and 15, a coil spring 22 is mounted to extend, under selected tension, between the lever arm 20 and a suitable anchor element 23, which latter also may be part of the frame of the structure in which the mechanism is mounted. Tension on the spring 22 preferably may be adjusted by suitable means, such as, for example, a wing nut 24 threaded onto an eye bolt 25 connected to the other end of the spring 22.

OPERATION OF THE MECHANISM SHOWN IN FIGS. 1 and 2

With the belts 14 and 15 in their selected grooves around the V-groove pulleys 10 and 12, the pressure-exerting sheaves 17 and 18 riding on the flat sides of the slack runs of their respective belts 14 and 15, and the lever arm 20 to each of the axes of sheave rotation is inversely proportional to the number of sheaves mounted on said sheave axes. Thus, where $L_1$ and $L_2$ designate the lengths of the respective lever arms on opposite sides of the lever arm-to-walking beam fulcrum, and $N_1 : L_2 :: N_2 : N_1$.

The further modified structure shown in FIG. 4 is for equalizing the tension on four belts 36, 37, 38 and 39, and comprises two secondary walking beams 40 and 41, each having two sheaves 42, 43 and 44, 45, respectively, journaled on opposite ends thereof. The secondary walking beams 40 and 41 are pivotally mounted medially of their respective lengths on opposite ends of a primary walking beam 47, which, in turn, is fulcrumed medially of its length at 46 on one end of a spring-biased lever 48. The other end of the lever 48 is pivotally mounted on a support element 49, which may be a portion of the frame of a mechanism, not otherwise shown, in which the invention is embodied, and is biased to exert pressure on the sheaves toward the belts. One of the sheaves 42, 43, 44 and 45 bears on each of the four belts 36, 37, 38 and 39. From the description of the invention given previously herein, it is obvious that all four of the sheaves 42, 43, 44 and 45 are mounted at the ends of lever arms of equal length from the walking beam-to-lever fulcrum 46, and also that they all bear with equal pressure on their respective belts.

From the foregoing, it is apparent that, in applications wherein it is desired to equalize the tension of all of the belts of a multiple belt drive, with an even number of sheaves and belts, the sheaves are divided between the two ends of the walking beam in two equal groups, while with an uneven number of sheaves and belts the sheaves are divided between the two ends of the walking beam in two groups as equal as possible with whole numbers. In either case the distance from the pivotal axis of the walking beam to the axis of each group of sheaves is inversely proportional to the number of sheaves mounted on the sheave axes. Also, where it is desired to vary the pressure between one or more of the belts of a multiple belt drive and the remaining belt or belts, variation in the lever arm between the fulcrum and the respective sheave axes is varied in accordance with the foregoing formula to provide such variation.

The invention provides a simple and effective mechanism for controlling the tension on the belts of a multiple belt drive, for example, such as that used for driving the freon compressor of an air conditioning mechanism on a bus, and avoids the necessity of purchasing the more expensive matched sets of belts, which, even though they may be perfectly matched when they are installed, still do not stay that way, particularly when subjected to the heat, oil and other abuses to which they are exposed in use.

Having thus described the invention, what is claimed as new and useful and desired to be secured by U.S. Letters Patent is:

1. Mechanism for controlling the tension of the belts of a multiple V-belt drive comprising a first multiple V-groove drive pulley, a second multiple V-groove driven pulley, a plurality of V-belts, each of which is passed around and seated in respective grooves of both of said pulleys, said mechanism comprising:

a lever pivotally mounted to a support element adjacent said belts,
   a walking beam pivotally connected to said lever by a fulcrum, said fulcrum being spaced from the pivotal mounting for the lever and located intermediately of the ends of the walking beam,
   a pressure sheave axis adjacent each end of the walking beam, said axes being parallel and spaced at selected distances on opposite sides of the walking beam-to-lever fulcrum,
   at least one pressure sheave journaled for rotation on each pressure sheave axis, the total number of pressure sheaves corresponding to the number of belts, said pressure sheaves being offset axially thereof by a distance equal to the lateral separation between adjacent belts, and positioned with one of the pressure sheaves in rolling relation with each of the belts,
   the distance from the fulcrum to each pressure sheave axis being inversely proportional to, (a) the number of pressure sheaves journaled on the respective axes, and (b) the desired pressure ratio of the sheaves journaled on each pressure sheave axis, and
   biasing means urging the lever in a direction, and with force of a magnitude, to exert selected, equal pressure of the pressure sheaves on their respective belts.

2. Belt tension control mechanism as claimed in claim 1 wherein the plurality of belts is two, and a single pressure sheave is journaled on each of said axes.

3. Belt tension control mechanism as claimed in claim 1 wherein the plurality of belts is three, two pressure sheaves are journaled co-axially on one of said axes, and a third pressure sheave is journaled on the other of said axes.

4. Belt tension equalizing mechanism as claimed in claim 1 wherein the plurality of belts is an even number, the number of pressure sheaves is equal to the number of belts, and the sheaves are divided into two equal groups, one of said groups being journaled co-axially on each of said axes.

5. Belt tension equalizing mechanism as claimed in claim 1 wherein the plurality of belts is an odd number greater than three, the pressure sheaves are divided into two groups as equal as possible with whole numbers, and the pressure sheaves of each of said groups are mounted co-axially on one of the axes.

6. Belt tension controlling mechanism as claimed in claim 1 wherein equal pressure is desired on all of the pressure sheaves, the number of belts is equal to $N_1 + N_2$, the number of pressure sheaves journaled on one of said axes is equal to $N_1$, the number of sheaves journaled on the other of said axes is equal to $N_2$, the distance from the walking beam-to-lever fulcrum to said one axis is represented by the term $L_1$, the distance from said fulcrum to said other axis is represented by the term $L_2$, and the latter distances are in the ratio $L_1 : L_2 :: N_2 : N_1$.

7. Mechanism for controlling the tension of the belts of a multiple belt drive as claimed in claim 1 wherein means is provided for regulating the force exerted by the biasing means on the lever.

* * * * *